United States Patent [19]

English, Jr.

[11] 4,267,927
[45] May 19, 1981

[54] ARTICLE OF MANUFACTURE COMPRISING PROTECTIVE PACKAGING FOR PACKAGEABLE OBJECTS OF A FRAGILE OR PERISHABLE NATURE

[76] Inventor: Edgar English, Jr., 45125 Redwood Ave., Lancaster, Calif. 93534

[21] Appl. No.: 87,316

[22] Filed: Oct. 22, 1979

[51] Int. Cl.³ .............................................. B65D 85/42
[52] U.S. Cl. ................................... 206/524; 206/328; 264/42
[58] Field of Search ............... 206/524, 328, 332, 334, 206/814; 264/45.3, 45.4, 42

[56] References Cited

U.S. PATENT DOCUMENTS

| | | | |
|---|---|---|---|
| 2,409,910 | 10/1946 | Staber | 264/45.4 |
| 2,873,392 | 2/1959 | Rich | 206/334 |
| 2,895,603 | 7/1959 | Freeman | 206/524 |
| 2,971,640 | 2/1961 | Snelling | 206/524 |
| 3,253,064 | 5/1966 | Buonainto | 264/45.4 |
| 3,285,400 | 11/1966 | High | 206/524 |
| 3,346,221 | 10/1967 | Farmer | 206/334 |
| 3,389,195 | 6/1968 | Gianakos | 264/45.4 |
| 3,536,190 | 10/1970 | Hirsch | 206/524 |

*Primary Examiner*—Herbert F. Ross

[57] ABSTRACT

The invention relates to protective packaging of objects of a fragile nature, such as electronic components, optical components, and other delicate or fragile food objects, and comprises hollow protective container portions arranged to be positioned in a manner defining a hollow interior chamber for protectively packaging such fragile or perishable objects, with said container portions being provided with shaped inner liner parts having shaped recess portions formed in place therein in the presence of such packageable objects and at least partially engaging corresponding parts of such packageable objects, with the shaped inner liner parts comprising a multi- phase material of foamed-in-place compressible, plastic material interspersed with bubble-pack means having closely adjacent gas cells which are isolated cells. In one preferred form, each container portion is formed of laminated material of a novel high-strength-to-weight ratio type including high-strength stiffening portions and lower strength, extremely low-density, high-specific-volume filler material which, in one preferred form, includes either, associated with said panelling material and/or associated with said shaped liner parts a combustion-inhibiting material comprising particles which are preferably of a heat-responsive nature adapted to decompose when subjected to the heat of a combustion and to produce an effectively built-in fire extinguishing gas (which will also mean a fire-preventing gas), usually a halogen containing a substantial quantity of bromine and adapted to prevent combustion originating from other adjacent structures or to substantially inhibit same and to prevent combustion of the foam plastic material either in the panelling material or the multi-phase shaped inner liner parts.

11 Claims, 12 Drawing Figures

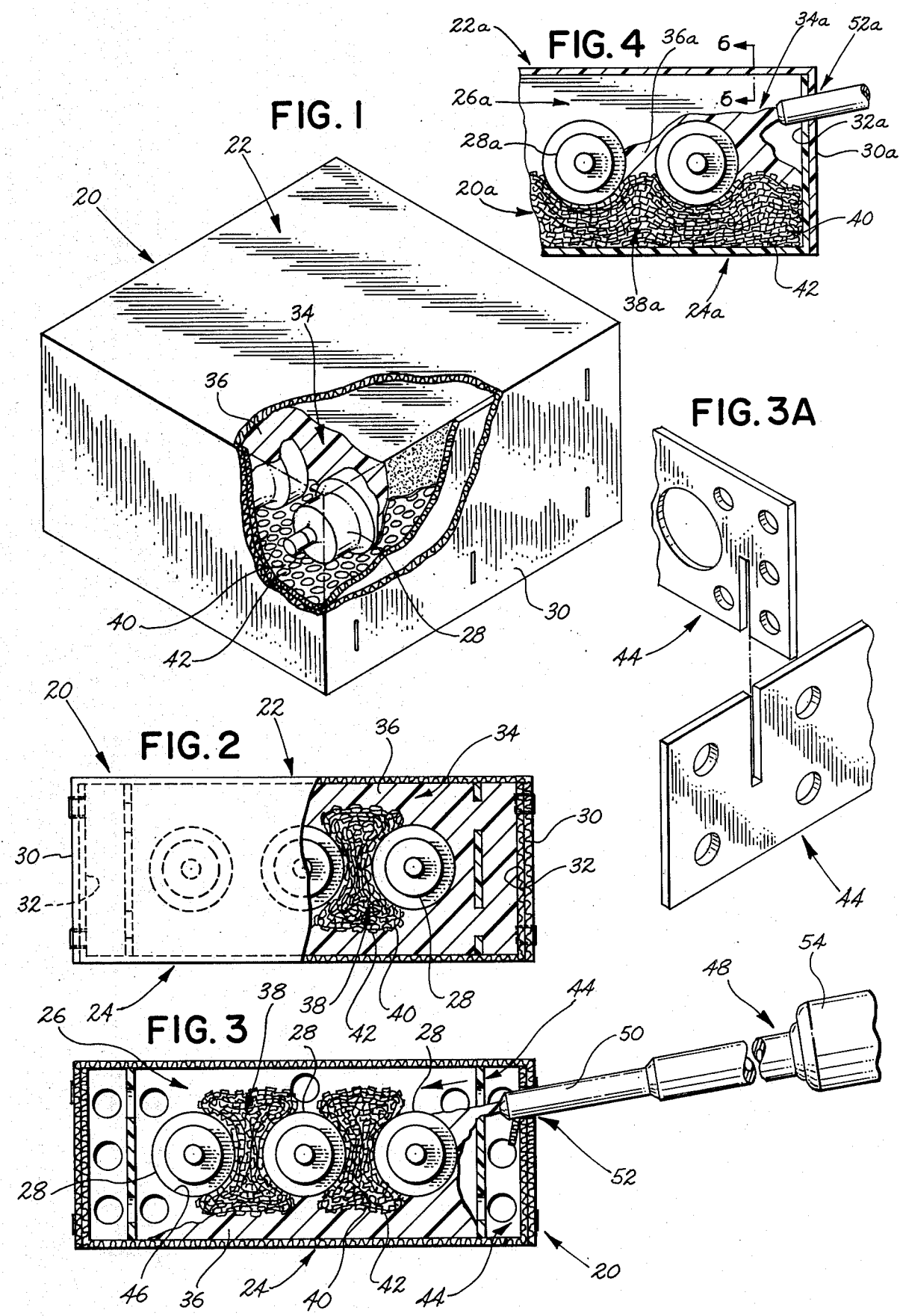

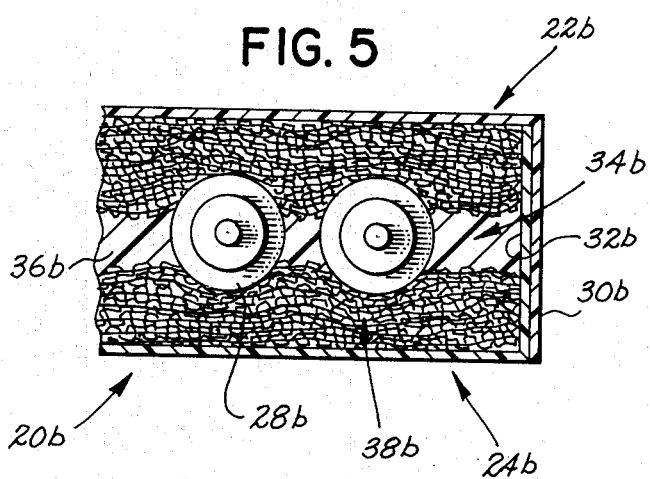
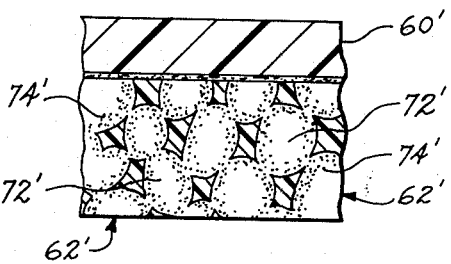
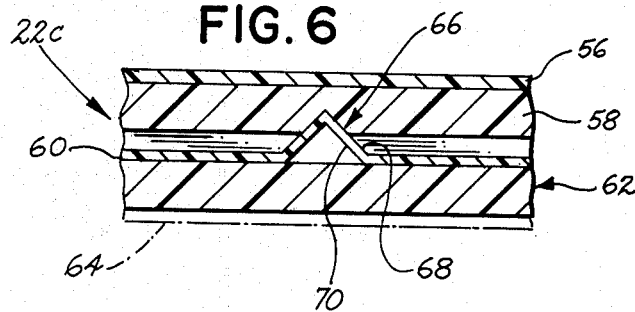
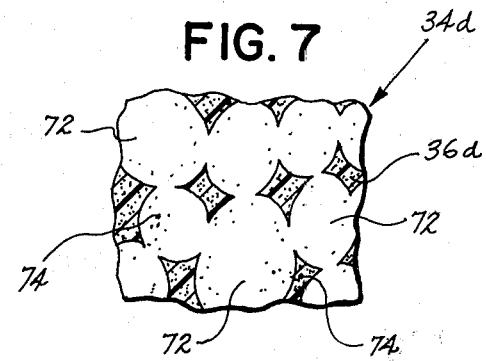
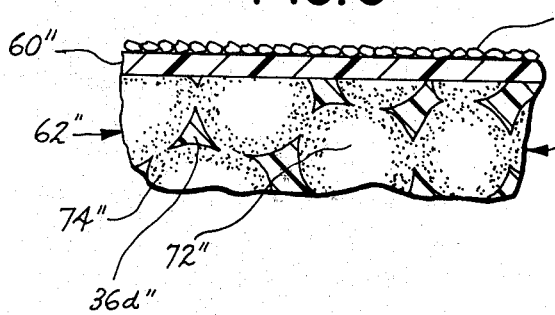
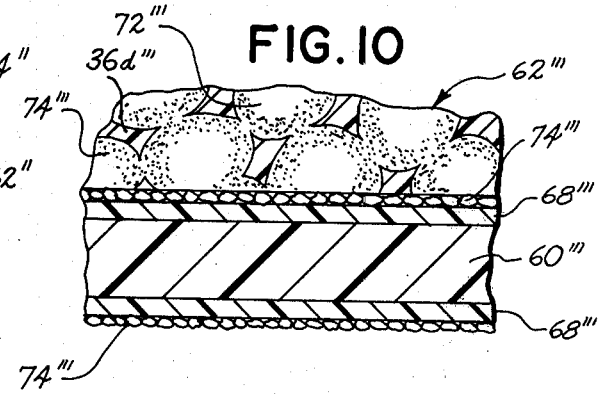
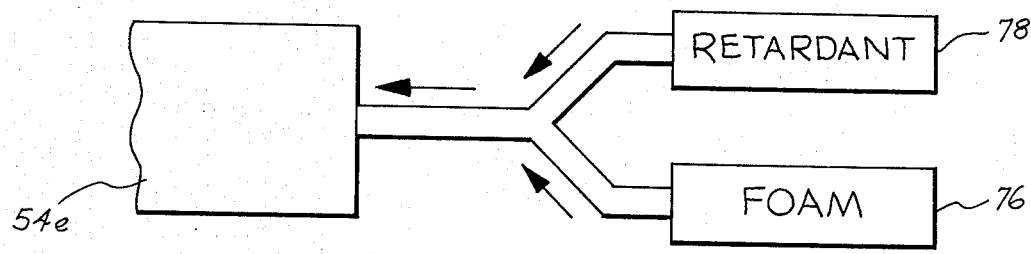

ARTICLE OF MANUFACTURE COMPRISING PROTECTIVE PACKAGING FOR PACKAGEABLE OBJECTS OF A FRAGILE OR PERISHABLE NATURE

BACKGROUND OF THE INVENTION

Various types of packaging structures have been, and are being employed for packaging and shipping perishable or fragile packageable objects. These have included the use of various kinds of packaging material intended to both space and protect the fragile or perishable objects within an outer box. In certain cases, these have comprised shredded or folded paper. In other cases, expanded plastic beads have been used to surround the fragile or perishable object or objects to be packaged within a box and in some cases, layers of convoluted or corrugated paperboard or cardboard have been employed as spacers for properly holding and spacing such fragile or perishable objects within a box. However, most of said prior art inner spacing and supporting material has been of a type capable of relative movement within a box when in packaging usage with respect to a fragile object. In other words, certain portions of said spacing material could move, relative to other portions and this does not lead to positive positioning of one or more inner fragile objects. Indeed, if such a fully packaged container using such relatively moveable prior art inner spacing material is placed in one position and vibrated, frequently it will be found upon opening the box, that because of relative mobility of certain portions of the prior art inner spacing material, a relatively heavy, but fragile inner packaged object may have worked out of its initial and intended position within the box and may actually be very near to, or even against, the inside surface of one of the walls of the box. This would, of course, make any subsequent impact very likely to damage the intended-to-be-protected fragile object, thus, defeating the whole purpose of such packaging. Another prior art problem has been the fact that such prior art spacing and supporting material has usually been extremely flammable, or combustible, thus, greatly increasing the possibility of an entire shipment of boxes packaging a large number of such fragile objects to go up in flames, if even only a small fire starts somewhere therein in any manner whatsoever. Also, certain of said prior art spacing and supporting materials (those made of loose plastic foam beads, pellets, or small balls) may produce, as a by-product of any such fire, an extremely toxic effluent gas which has been found to be very dangerous to any nearby person or animal.

Thus, it is clear that the provision of a relatively fixed-in-place inner spacing and supporting means which would not allow relative movement of portions thereof engaging a fragile object would be highly advantageous, because it would prevent the type of vibration-caused movement out of position of such a fragile object as that mentioned above as characteristic of certain prior art loose, relatively moveable spacing and filling materials. It is also clear that the provision of a packaging arrangement of the type mentioned immediately above, including built-in fire-preventing and/or fire-extinguishing means would be extremely advantageous, and it is precisely such a highly desirable and advantageous type of protective packaging which is provided by, and in the present invention and which has major advantages completely overcoming the above-mentioned prior art disadvantages and limitations, and all of which advantages flow from, and occur by, reason of the specific features of the invention described hereinafter.

SUMMARY OF THE INVENTION

Generally speaking, the protective packaging article of manufacture of the present invention comprises hollow protective container means having at least two container portions and, in certain forms, also being provided with means for relatively positioning the two container portions in a manner defining a hollow interior chamber for protectively receiving and packaging one or more objects of a fragile or perishable nature and, with at least one of said container portions being effectively provided with shaped inner liner means having one or more shaped recess means formed in place therein in the presence of such previously received packageable objects and at least partially engaging in, in at least partially area-coextensive contact, corresponding parts of such previously-received packageable objects, and with the shaped inner liner means comprising multi-phase material taking the form in each case, of a protective, compressible partial pad means of foamed-in-place compressible, expanded-cell foam plastic material having interspersed therein or therebetween effective bubble-pack means having a large number of closely-adjacent gas cells which, in one preferred form, are of isolated and non-communicating cell type and which also, in one preferred form, comprise air cells.

In one preferred form of the invention, the other of the above-mentioned two container portions is also effectively provided with shaped inner liner means similar to the shaped inner liner means of the first-mentioned one of said two container portions and similarly has one or more similarly shaped recess means formed in place therein in the presence of such previously received packageable objects in a manner such as to at least partially engage said packageable objects in at least partially area-coextensive contact with corresponding but different parts of such previously-received packageable objects from the parts thereof engaged by the shaped recess means of the first-mentioned shaped inner liner means of the first container portion whereby to cause each of a plurality of such packageable objects to be protectively received between the two container portions in a manner such as to firmly, non-movably and protectively support same within the recess means in effectively nested relationship therein.

In one preferred form of the invention, at least a part of a complete assembly comprising the container portions and shaped inner liner means takes the form of compressible expanded-cell foam plastic material comprising a high-efficiency shock-isolation means and/or a high-efficiency thermal insulation means as a consequence of being made of a low-density, high-specific-volume filler material which provides a maximized volume-to-weight ratio and which is further provided with combustion-inhibiting means comprising a quantity of a heat-responsive combustion-inhibiting agent of a type adapted to be normally effectively dormant and inactive at normal temperatures, but to decompose and become active when subjected to heat in excess of a predetermined magnitude.

In one preferred form having such a combustion-inhibiting agent, it comprises a solid material in particulate form which is of a type decomposable when subjected to the heat of combustion of the filler material or any other adjacent materials and which is adapted to produce, as a result of such decomposition, a fire-extinguishing gas, which in one preferred form, comprises a halogen containing a substantial quantity of bromine, such as a halogenated compound as exemplified by, but not limited to, carbon tetrabromide or alternatively, such a related halogenated compound such as exemplified by, but not limited to, carbon tetraiodide, or substantial equivalents thereof.

While the generally defined invention may have container portions made of various different suitable materials, certain of which have been employed for boxes or containers in the prior art, in one preferred form, either or both of the container portions may be effectively made of a structural panelling material formed from an initial sheet thereof into laminated panelling means defining in configuration, the desired container portion or portions and with said laminated panelling means, in one preferred form of the invention, including a plurality of panelling material layers firmly bonded together at a plurality of area-spaced, area-disseminated, multi-point interface attachment and junction locations and each comprising an interface junction means, with said plurality of interface junction means being spaced over an area coextensive with said laminated panelling means, said plurality of layers of said laminated panelling means including at least one convoluted weight-reducing, strength-increasing, stiffening layer of structural, formed material having a plurality of convolutions extending transversely from a surface plane thereof, said convolutions having outer contact surface portions in contact with corresponding surface portions of a corresponding, next-adjacent layer of said laminated panelling means and effectively provided with and defining said plurality of interface junction means, at least said convoluted, weight-reducing, and strength-increasing layer of said laminated panelling means being made of a formable thin-sheet high-strength material characterized by substantial strength and rigidity when in hardened form, at least one of said plurality of layers of said laminated panelling means other than said effectively convoluted, weight-reducing, strength-increasing, stiffening layer thereof comprising a low-density, high-specific-volume filler material greatly increasing the effective thickness of the composite laminated panelling means and, thus, providing a maximized volume-to-weight ratio.

Also, in one preferred form of the invention wherein one or more container portions is made of the above-mentioned laminated panelling means, combustion-inhibiting means of the type previously mentioned as being carried within the container means by the shaped inner liner means may also be carried by the laminated panelling means forming the container wall and, in particular, by the filler material portion of the laminated panelling means, although not specifically so limited.

In one preferred form, the hollow protective container means is effectively provided with controllably openable and closeable positioning and effective engagement means for normally engaging corresponding portions of the container portions and effectively maintaining the container portions in properly positioned and supported relationship with respect to each other, which relationship might also be termed aligned registration relationship. Also, in a preferred form, fastening and locking means may be provided so as to be effectively cooperable with respect to at least two container portions for firmly locking them together in closed fragile-object-protecting relationship.

OBJECTS OF THE INVENTION

With the above points in mind, it is an object of the present invention to provide an article of manufacture forming protective packaging means for packageable objects of a fragile or perishable nature and provide with shaped inner liner means of multi-phase material taking the form of protective compressible partial pad means of foamed-in-place compressible, expanded-cell foam plastic material interspersed with, and thereby effectively diluted by, substantial quantities of effective bubble-pack means made of sheeting defining a large number of closely-adjacent hollow cells usually filled with a gas, such as air and acting to reduce the effective weight and cost of the entire inner liner means while not losing the advantage of immobility to received fragile objects provided by the foamed-in-place expanded-cell foam plastic material.

It is a further object to provide a protective packaging article of manufacture of the character defined in the preceeding object wherein the shaped inner liner means is also provided with combustion-inhibiting means of a normally effectively dormant type inactive at normal temperatures, but adapted to become active in a fire-inhibiting and/or fire-extinguishing manner when subjected to high temperatures such as are normally associated with combustion.

It is a further object to provide a protective packaging article of manufacture of the character defined in the preceding object wherein the combustion-inhibiting means comprises a solid material in particulate form and of a type adapted to decompose when subjected to the heat of combustion and as a consequence thereof, to produce a fire-inhibiting or fire-extinguishing gas, which, in one form comprises a halogen containing a substantial quantity of bromine such as carbon tetrabromide, or substantial equivalent, and, in another form, comprises a halogenated compound such as carbon tetraiodide, or substantial equivalent thereof, whereby to not only inhibit and substantially prevent combustion, but also to inhibit and substantially prevent the production of noxious and/or toxic effluent gases often produced by the combustion of foam plastic materials.

It is a further object in any and all of the various different forms of the invention to encompass the concept of various types of containers made of various types of materials, including those well-known in the art, for use in such a container (including one or more container portions effectively made of a structural panelling material into laminated panelling means forming the desired container portion or portions and including a plurality of panelling material layers firmly bonded together at a plurality of area-spaced, area-disseminated, multi-point interface attachment and junction locations and each comprising an interface junction means, with said plurality of interface junction means being spaced over an area coextensive with said laminated panelling means, said plurality of layers of said laminated panelling means including at least one convoluted weight-reducing, strength-increasing, stiffening layer of structural, formed material having a plurality of convolutions extending transversely from a surface plane thereof, said convolutions having outer contact surface portions in contact with corresponding surface portions of a corresponding, next-adjacent layer of said laminated panelling means and effectively provided with and defining said plurality of interface junction means, at least said convoluted, weight-reducing, and strength-increasing layer of said laminated panelling means being made of a formable thin-sheet high-strength material characterized by substantial strength and rigidity when in hardened form, at least one of said plurality of layers of said laminated panelling means other than said effectively convoluted, weight-reducing, strength-increasing, stiffening layer thereof comprising a low-density, high-specific-volume filler material greatly increasing the effective thickness of the composite laminated panelling means and, thus, providing a maximized volume-to-weight ratio.

It is a further object of the invention to provide a protective packaging article of manufacture of the character defined in the preceding object wherein the laminated panelling means forming one or more container portions is provided with combustion-inhibiting means, preferably but not necessarily in all forms thereof, carried by the low-density, high-specific-volume filler material thereof and comprising a quantity of heat-responsive combustion-inhibiting agent of a type similar to that previously referred to above in connection with the fire proofing of the inner liner means and adapted to similarly decompose when subjected to heat in excess of a predetermined magnitude and to convert from a normal dormant inactive condition to a positively active fire-inhibiting and/or fire-extinguishing condition.

Further objects are implicit in the detailed description which follows hereinafter (which is to be considered as exemplary of, but not specifically limiting, the present invention), and said objects will be apparent to persons skilled in the art after a careful study of the detailed description which follows.

For the purpose of clarifying the nature of the present invention, several exemplary embodiments of the invention are illustrated in the hereinbelow-described figures of the accompanying drawing sheet and are described in detail hereinafter.

BRIEF DESCRIPTION OF THE DRAWING

FIG. 1 is a reduced-size, three-dimensional, pictoral, oblique, isometric, partially broken-away view illustrating one exemplary embodiment of the present invention comprising packaging means and fragile objects to be packaged in fully-assembled and packaged relationship with various portions partially broken away to clarify the interior construction thereof.

FIG. 2 is an end view partly comprising an end elevational view of the complete fully-assembled protective packaging article of manufacture of FIG. 1 and partly comprising a transverse cross-sectional view thereof taken on a plane just inside the left-of-center end wall of the container means of FIG. 1, so that the corresponding interior packaged fragile object is still shown in front elevation, while container walls and one vertical wall of an inner supporting structure or spider are shown in cross section.

FIG. 3 is a cross-sectional view taken on a plane generally similar to the plane of the sectional view of the right half of the assembly as shown in FIG. 2, but in the case of FIG. 3, shows it prior to having remaining open spaces within the container means filled with one form of filler material comprising foam plastic material of cellular construction, which is shown in the process of actually being foamed-in-place by insertion of a presurized gun adapted to emit the constituents which react with each other within the hollow interior of the container means to form plastic foam in place in all open areas surrounding the other constituent (bubble-pack) of the effective two-phase material filling the container means and surrounding engaging and holding in place the fragile objects packaged therein.

FIG. 3A is a fragmentary, greatly-reduced-size view, showing one exemplary inner support means or spacer means or spider means for temporarily holding the fragile objects to be packaged within the container means prior to the filling of all remaining spaces within the container means with the two-phase material comprising the bubble-pack material and the foamed-in-place expanded-cell foam plastic material which, together, form what might be termed shaped inner liner means.

FIG. 4 is a fragmentary, partially-sectional view generally similar to the right portion of FIG. 3, but illustrating a different type of effective inner support, or spacer means wherein a lower layer of the bubble-pack means functions for such fragile-object-supporting (and spacing) purposes prior to the pressurized filling of the remaining open portions of the hollow interior chamber by pressurized foamed-in-place cellular plastic material, as shown in the act of accomplishment in FIG. 4.

FIG. 5 is a fragmentary view similar to just the right end portion of FIG. 4, which shows a slight modification, wherein additional upper bubble-pack means is used as part of the effective support or spacer means.

FIG. 6 is a greatly-enlarged fragmentary sectional view of a modified form of the invention wherein the modification consists of a change of material for the container portions and is shown at a location on such a modified version equivalent to that shown by the arrows 6—6 of FIG. 4.

FIG. 7 is a greatly-enlarged, fragmentary, simplified and somewhat symbolic diagrammatic sectional view of a portion of the cellular foam material comprising the shaped inner liner means and illustrates it as being provided with one representative form of inclusion of a combustion-inhibiting agent.

FIG. 8 is a greatly enlarged, fragmentary, simplified and somewhat symbolic diagrammatic sectional view of a portion of the laminating panelling means forming the container wall portions of the modified form of the invention illustrated in FIG. 6 and shows it also as having one representative form of inclusion of a combustion-inhibiting agent.

FIG. 9 is a view similar to FIG. 8, but illustrates a slight variation of the mode of inclusion of the combustion-inhibiting agent.

FIG. 10 is another view similar to both FIG. 8 and FIG. 9, but illustrates a further slight variation in the mode of inclusion of a combustion-inhibiting agent in another representative form thereof.

FIG. 11 is a fragmentary, incomplete and symbolic, diagrammatic view illustrating a slight modification of the cellular plastic foam-producing gun best shown in FIG. 3 and which is intended to produce the foamed-in-place cellular plastic portions of the shaped inner liner means of the fire-inhibiting type shown fragmentarily in FIG. 7.

DESCRIPTION OF THE PREFERRED EMBODIMENTS

The exemplary first form of the invention shown in FIGS. 1-3 inclusive, illustrates the article of manufacture of the present invention as taking the form of protective packaging means for packageable objects of a fragile or perishable nature, such as vacuum tubes or the like, as illustrated, although it should be clearly understood that the invention is not specifically so limited. In said exemplary first form, the protective packaging means comprises hollow protective container means, such as is generally designated by the reference numeral 20, which is shown in the illustrated example as comprising two container portions such as the top container portion 22 and the bottom container portion 24 and effectively provided with means for relatively positioning same in a manner defining a hollow interior chamber, such as that generally indicated at 26, for protectively receiving and packaging objects of a fragile or perishable nature, such as the plurality of exemplary, but non-limiting, vacuum tubes indicated at 28.

In the example illustrated, the above-mentioned means for relatively positioning the two container portions 22 and 24 takes the form of side walls, such as are indicated at 30 in the case of the first-mentioned or top container portion 22, and corresponding similarly-shaped and slightly inwardly displaced cooperating sidewall portions 32 carried by the second-mentioned bottom container portion 24. In other words, in the example illustrated, the top container portion 22 is of substantially rectangular shape as seen in plan view and has four perpendicularly-related downwardly extending sidewall portions 30, so as to define an upper, downwardly open first container portion 22 of substantially hollow parallelopiped shape. Similarly, in the example illustrated, the bottom container portion 24 is of a similar rectangular plan view shape and has four perpendicularly-related upstanding sidewall portions 32 so as to define the lower container portion 24 as being of upwardly open hollow parallelopiped shape, having transverse dimensions slightly less than those of the sidewall portions 30 of the upper container portion 22, so the two sets of walls portions 30 and 32 can be slideably engaged from initially separated open relationship whereby to effectively provide the closed hollow container means 20.

At least one of the two container portions 22 and 24 is intended to be provided with, and will be provided with, shaped inner liner means which can be best seen fragmentarily at 34 in FIG. 1 above the packageable objects 28 and which can be seen as indicated at 34 in FIG. 2 both above and below the packageable objects 28. The shaped inner liner means 34, in the exemplary first form of the invention illustrated, comprises a multiphase material taking the form of protective partial pad means of foamed-in-place compressible, expanded cell foam plastic material 36 having interspersed therein or between various portions thereof what might be termed effective bubble-pack means, such as is indicated generally at 38 in one representative, but non-specifically limiting form, and which has a large number of closely-adjacent, but normally isolated and, in certain cases, non-communicating, cells which, in a broad sense, may be termed gas cells, although usually, in a preferred form, the gas contained therein comprises air and thus, the cells may be referred to in that specific form as air cells.

In the exemplary form illustrated, the effective bubble-pack means 38 is made of plastic sheeting material 40 defining the plurality of air cells 42 therebetween and is of a relatively inexpensive, readily available type of construction well-suited to supplement the foamed-in-place expanded cell plastic material 36 and together therewith, adapted to define a relatively inexpensive shaped inner liner means 34 of multi-phase material. It should also be noted that as will be referred to hereinafter, the bubble-pack means 38 may also provide another very desirable advantage, in that it may be employed as initial spacer means or support means for holding the plurality of fragile objects 28 in desired properly spaced locations within the hollow interior chamber 26 prior to the insertion of the foamed-in-place compressible, expanded-cell foam plastic material 36, as is illustrated fragmentarily in one exemplary manner in FIG. 4 and in another manner, in FIG. 5.

In the example illustrated, it can be said that both of the container portions 22 and 24 are effectively provided with the previously-mentioned shaped inner liner means 34 and that the compressible expanded-cell foam plastic material 36 is adapted to be foamed-in-place after the fragile objects 28 are placed within the hollow interior chamber 26 and also after the effective bubble-pack means 38 has also been placed within the interior chamber 26 in a desired relationship with respect to the fragile objects 28 and the two container portions 22 and 24.

The foaming-in-place operation referred to in the preceding paragraph is facilitated, if suitable spacer means or support means, or the functional equivalent thereof, has been also initially placed within the hollow interior chamber 26 in effective supporting and/or spacing relationship relative to the fragile objects 28 and the walls of the container portions 22 and 24. While such spacing and support may be provided by the appropriate placing of the bubble-pack means 38, it may also be independently provided by the positioning within the interior chamber 26 of a multi-walled and multi-apertured supporting structure which itself, is of very small volume, but which completely extends across the hollow interior chamber 26 and provides appropriately-spaced apertures for supporting and spacing cooperation with the fragile objects 28.

As is best shown in FIGS. 2, 3 and 3A, such a supporting and spacing structure or spider is designated by the reference numeral 44 and comprises multi-apertured, thin, spaced, vertical wall members in a perpendicular array and having apertures 46 properly located for receiving and supporting cooperation with the exteriors of the corresponding fragile objects 28. In other words, the arrangement is such that, with the supporting and spacing spider 44 receiving and carrying the plurality of fragile objects 28, the combination thereof provides a large unimpeded portion of the interior chamber 26 still in open unfilled condition as is best shown in FIG. 3. At this time, an applicatory pressurized gun, shown fragmentarily at 48, has a nozzle portion 50 thereof temporarily inserted through a one-way and one-time operable effective valve means or opening 52 into the hollow chamber 26 and the pressurized applying gun 48 is then operated in a conventional manner, well-known in the art, for simultaneously feeding and producing foamed-in-place expanded cell foam plastic material 36.

The detailed construction of the pressurized plastic forming and applying gun 48 are not shown, since such are well-known in the art. Usually, in such arrangements, the various chemical constituents which will produce a foam plastic material are supplied to a common pressurized chamber, such as that indicated fragmentarily at 54, just prior to being fed into the region where the plastic foam is desired to be formed and in the example illustrated, such just-mixed well-known plastic foam-producing chemicals are effectively combined in the fragmentarily-shown chamber 54 just prior to being pressure-fed through the hollow nozzle 50 into the interior chamber 26 where the remainder of the plastic foam-forming operation is completed in an entirely conventional manner. The plastic foam material 36 provided by the just-described foaming-in-place operation may be polyurethane, polystyrene or any other suitable plastic material capable of such foaming action. As will be briefly described hereinafter, with reference to FIGS. 7 through 11, the foam plastic-producing constituents may also be provided with combustion-inhibiting means comprising a quantity of appropriately-located heat-responsive combustion-inhibiting means which may, in one preferred form, be applied most conveniently, along with the feeding of the plastic foam-producing constituents. This will be described more fully hereinafter.

The container portions 22 and 24 may be made of any suitable material having the desired shock isolation characteristics and, of course, having structural strength suitable for its intended usage and to facilitate stacking of multiple containers 20, without damage to any of same. However, as referred to hereinafter, either, or both of the container portions 22 and/or 24 may be made of plastic material and, in particular, a special kind of laminated plastic material forming what may be termed laminated panelling means of an extremely high-strength-weight ratio, such as is fully disclosed and claimed, as a structural material, in my co-pending patent application Ser. No. 86,748, filed Oct. 22, 1979, entitled: "AN ARTICLE OF MANUFACTURE COMPRISING PANEL MATERIAL HAVING A LARGE MAGNITUDE STRENGTH-TO-WEIGHT RATIO AND MEANS EMBODYING SAME," and, thus, reference is made to my said co-pending application for full and specific details of that type of laminated panelling means construction for use in either or both of the two container portions 22 and 24. It is believed that further lengthy details of said construction would be redundant in the light of said full disclosure provided in my above-identified co-pending application, which is to be considered as effectively incorporated herein at this point, and which will be specifically incorporated herein if it is thought necessary to do so.

FIG. 4 illustrates a slight variation of the first form of the invention shown in FIGS. 1-3 inclusive, wherein the variation consists primarily of the elimination of the spacing and support means 44 of the first form of the invention and the use, in lieu thereof, of a larger, lower bubble-pack means adapted to be positioned below the fragile objects. Because this figure does illustrate a slight modification, similar parts are designated by similar reference numerals followed by the letter "a". Thus, the larger lower bubble-pack means mentioned above as being used in FIG. 4 in lieu of the support and spacing means 44 of the first form of the invention, is designated by the reference numeral 38a and is normally placed within the container means 20a while it is open, after which the fragile objects 28a are placed within the bottom portion 24a of the container 20a on the bubble-pack means 38a which will both support and properly space the fragile objects 28a within the container 20a. Then, the expanded-cell foam material 36a is foamed-in-place either before the upper container portion 22a is moved into closed relationship with respect to the bottom container portion 24a, or is foamed-in-place after the two container portions are closed by insertion through a one-way filling opening 52a similar to that previously described at 52 in connection with FIG. 3 of the first form of the invention. Thus, the entire upper portion of the hollow interior chamber 26a can be filled with the cellular foam plastic material 36a so as to firmly lock the fragile objects 28a in place in a completely protected manner, similar to that shown in FIG. 2 of the first form of the invention, although there will be a slightly different distribution of the multi-phase material of the slightly modified shaped inner liner means 34a. Otherwise, the FIG. 4 modification is essentially the same as the first form of the invention shown in FIGS. 1-3 and no further detailed description thereof is provided because of its obvious redundancy, in the light of the fully-detailed description of the similar portions of the first form of the invention.

FIG. 5 illustrates a further slight modification of the first form of the invention and of the slight variation thereof shown in FIG. 4 and merely comprises the elimination of the support means 44 of the first form of the invention and the use of upper and lower bubble-pack means within the container to function for support and spacing purposes. Therefore, similar parts thereof are designated by similar reference numerals followed by the letter "b".

FIG. 5 is substantially identical in almost all of its structure and parts to the showing of FIG. 4, with the exception of the fact that each of the reference numerals is followed by a small "b", rather than a small "a", as shown in FIG. 4. However, additional upper bubble-pack means 38b is shown positioned above the fragile objects 28b, thus leaving an intermediate open region for the reception of the foamed-in-place cellular plastic material 36b. Otherwise, this modification is essentially the same as that illustrated in FIG. 4 and described above, and further detailed description is believed to be redundant.

FIG. 6 is an enlarged fragmentary sectional view illustrating a modified type of container wall construction wherein it may be said to be made of what is termed "laminated panelling means", and in this view, which, although shown as being taken on the section line 6—6 of FIG. 4, may or may not be employed in the FIG. 4 version of the invention, but may be used in a modified form thereof. Therefore, the laminated panelling top wall means is designated generally by the reference numeral 22c, and it may be said to comprise a plurality of panelling material layers, such as the layers indicated at 56, 58, 60, 62 and optionally, the layer 64, which are firmly bonded together at a plurality of area-spaced, area-disseminated, multi-point interface attachment and junction locations such as are indicated by the reference numeral 66 and each comprising an interface junction means 68, with said plurality of interface junction means 68 being spaced over the area coextensive with the laminated panelling means 22c. In the example illustrated fragmentarily in FIG. 6, the plurality of layers of the laminated panelling means 22c include at least one convoluted, weight-reducing, strength-increasing, stiffening layer of structural formed material having a plurality of convolutions extending transversely from a surface plane thereof and having outer extreme contact portions lying in a corresponding one of two oppositely symetrically-positioned spaced planes, each in contact with a corresponding inside surface portion of a corresponding, next outwardly adjacent layer of the laminated panelling means and effectively provided with and defining said plurality of interface junction means 66.

In the exemplary form shown fragmentarily in FIG. 6, the above-mentioned convoluted, weight-reducing, strength-increasing, stiffening layer is the layer identified by the reference numeral 60 and the convolutions thereof are identified by the reference numeral 70. The layers 58 and 62 are of expanded cell foam plastic resin material, which may or may not be enhanced by effective filler material, while the layer 56 and the other optional layer 64 may be protective or sealing outer and inner layers, respectively of the laminated panelling means 22c.

FIG. 7 fragmentarily illustrates a portion of the multiphase shaped inner liner material indicated at 34 in the first form of the invention and in this particular example, comprises the expanded cell plastic foam resin material indicated at 36 in the first form of the invention. However, each of same is indicated by the same reference numeral in FIG. 7 followed by the letter "d" because FIG. 7 illustrates a slight modification of said filler material, wherein the plastic foam material 36d contains a number of cells 72 and is provided with combustion-inhibiting means, such as is generally designated at 74, which is effectively carried by the low-density, high-specific-volume filler material comprising the plastic foam 36d and comprises a quantity of heat-responsive, combustion-inhibiting agent 74, adapted to be effectively dormant and inactive at normal temperatures, but to decompose and become active when subjected to heat in excess of a predetermined magnitude. In the example illustrated at FIG. 7, the combustion-inhibiting agent 74 comprises a solid material originally in particulate form and dispersed throughout the foam material 36d, primarily by being effectively deposited within the cells 72 and on the walls of the foam material forming the cells 72. However, it should be understood that it may be dispersed in other manners such as by being effectively intermixed with the plastic material itself, or being in layers, or other groupings throughout the foam material so as to be available for combustion-inhibiting purposes when needed.

FIGS. 8, 9, and 10 illustrate three variations of the laminated panelling means type of container wall construction, such as shown fragmentarily at 22c in FIG. 6 and each comprises an enlarged fragment of some selected portion thereof, carrying the combustion-inhibiting material in a slightly different manner with the major difference between each of said figures being the location of the combustion-inhibiting agent and its relationship to the laminated panelling material.

In FIG. 8, the combustion-inhibiting agent is indicated by the reference numeral 74' and it is shown as comprising a solid material in particulate form in disseminated locations throughout the expanded body of foam material 62' (which shall also be considered as being applicable to the other expanded body of foam material such as shown at 58 in FIG. 6) and within the interiors of the hollow cells 72'.

In the FIG. 8 form, the combustion-inhibiting agent 74' preferably comprises a halogenated compound such as carbon tetrabromide or carbon tetraiodide, or the like, such as to be adapted to produce, when subjected to the heat of combustion, a fire-extinguishing gas comprising a halogen, preferably of a type containing a substantial quantity of bromine.

FIG. 9 is similar to FIG. 8 and similar reference numerals are used to designate similar parts but are double-primed. In FIG. 9 the major difference from FIG. 8 is the fact that the combustion-inhibiting agent 74" is effectively provided in layers closely adjacent to and in area-coextensive relationship with response to the expanded body of foam material 62" (which shall also be considered as being applicable to the other expanded body of foam material corresponding to that shown at 58 of the FIG. 6 form of the invention).

FIG. 10 is almost identical to FIG. 9, but merely shows a slight difference with respect to the location of the combustion-inhibiting agent which in this case, is designated by the reference numeral 74'" and which is shown as lying primarily in the region of said interface junction means 68'".

It should be understood that each of the just-described FIGS. 8, 9, and 10, 20 and 21 is intended to show a different representative, but non-specifically limiting, arrangement for the inclusion of the combustion-inhibiting agent, but that the concept is broader than the specific showings of said three figures and includes various ways of including it, either in particulate solid or liquid form and either evenly disseminated throughout or locally concentrated at various selected and usually dispersed locations. Also, the representative type of combustion-inhibiting agent may be modified so as to include various other functional equivalents.

The means for positioning the combustion-inhibiting agent in the three different representative but non-specifically limiting forms shown in FIG. 8, FIG. 9 and FIG. 10 may assume a variety of forms, all within the broad scope of the present invention. In other words, the disseminating of the combustion-inhibiting agent 74' in the FIG. 8 example may comprise the dipping of either or both (usually both) of the foam layers 62' and the other one corresponding to that shown at 58 of the first form of the invention into an applying region such as a liquid carrier having a plurality of the particles of the combustion-inhibiting agent either in solution or in suspension or in the form of a slurry so that when dried the particles of the combustion-inhibiting agent 74' will be disseminated throughout the foam material and within the interiors of the plurality of hollow cells 72'. Of course, it should be understood that the layers of combustion-inhibiting means and/or plastic material may be used conjointly or either of same may be used alone and that various means and ways of applying same may be used and lie within the broad scope of the invention.

FIG. 11 merely illustrates in fragmentary, greatly simplified, block diagrammatic form, one means for producing the combustion-inhibited forms of the invention shown in FIGS. 7-10 inclusive, with particular reference to the form shown in FIG. 7. It is to be understood that the block diagrammatic structure shown fragmentarily at 54e in FIG. 11 is a chamber such as might be positioned at the rear end of the foam-applying gun chamber 54 of FIG. 3, but in this case, includes two auxiliary chambers, each also shown in block diagrammatic form, comprising a plastic foam constituent-supplying chamber 76 and a combustion-inhibiting-agent-supplying chamber 78, each of which is effectively pressure-fed in controlled ratios into the main chamber 54e, so that the plastic foam material formed in the interior of any of the various container variations will carry the combustion-inhibiting agent 74. This can also be considered as applicable in the foam layers 62 and 58 of the laminated panelling means 22c of FIG. 6, although they may be supplied with the combustion-inhibiting agent in various other ways such as are more fully disclosed and claimed in my co-pending patent application Ser. No. 86,748, filed Oct. 22, 1979, entitled: "AN ARTICLE OF MANUFACTURE COMPRISING PANEL MATERIAL HAVING A LARGE MAGNITUDE STRENGTH-TO-WEIGHT RATIO AND MEANS EMBODYING SAME", to which specific reference is hereby made.

Numerous modifications of construction and/or materials will be immediately apparent to those skilled in the art and are intended to be included within the scope of the present invention, which is to be included within the scope of the present invention, which is further intended to include all forms of the invention lying within the scope of the appended claims.

What is claimed is:

1. An article of manufacture taking the form of protective packaging means for packageable objects of a fragile or perishable nature, comprising: hollow protective container means comprising at least two container portions and means for relatively positioning same in a manner defining a hollow interior chamber for protectively receiving and packaging objects of a fragile or perishable nature, at least one of said container portions being effectively provided with shaped inner liner means having one or more shaped recess means formed in place therein in the presence of such previously received packageable objects and at least partially engaging in at least partially coextensive contact with parts of such previously received packageable objects, said shaped inner liner means comprising a multi-phase material taking the form of a protective compressible partial pad means of foamed-in-place compressible, expanded-cell foam plastic material and interspersed therebetween with effective bubble-pack means having a large number of closely adjacent, but completely isolated and non-communicating gas cells, said effective bubble-pack means comprises plastic sheeting forming said large number of closely adjacent, but completely isolated and non-communicating gas cells wherein enclosed gas comprises air, and wherein said gas cells effectively comprises air cells.

2. An article of manufacture as defined in claim 1, wherein at least a part of a complete assembly comprising said container portions and shaped inner liner means takes the form of compressible expanded-cell foam plastic material comprising a high-efficiency shock-isolation means and a high-efficiency thermal insulation means defined by a low-density, high-specific-volume filler material providing a maximized volume-to-weight ratio and provided with combustion-inhibiting means carried by said low-density, high-specific-volume filler material and comprising a quantity of heat-responsive, combustion-inhibiting agent adapted to be effectively dormant and inactive at normal temperatures, but to decompose and become active when subjected to heat in excess of a predetermined magnitude.

3. An article of manufacture as defined in claim 2, wherein said combustion-inhibiting agent comprises a solid material in particulate form and of a type decomposible when subjected to the heat of combustion and adapted to produce, as a result of such decomposition, a fire-extinguishing gas.

4. An article of manufacture as defined in claim 3, wherein said fire-extinguishing gas comprises a halogen containing a substantial quantity of bromine.

5. An article of manufacture as defined in claim 3, wherein said combustion-inhibiting agent comprises a halogenated compound such as carbon tetrabromide.

6. An article of manufacture as defined in claim 3, wherein said combustion-inhibiting agent comprises a halogenated compound such as carbon tetraiodide.

7. An article of manufacture as defined in claim 6, wherein said container portions are effectively made of a structural panelling material formed from an initial sheet thereof into laminated panelling means having the desired container portion configuration and including a plurality of panelling material layers firmly bonded together at a plurality of area-spaced, area-disseminated, multi-point interface attachment and junction locations and each comprising an interface junction means, with said plurality of interface junction means being spaced over an area coextensive with said laminated panelling means, said plurality of layers of said laminated panelling means including at least one convoluted weight-reducing, strength-increasing, stiffening layer of structural, formed material having a plurality of convolutions extending transversely from a surface plane thereof, said convolutions having outer contact surface portions in contact with corresponding, next-adjacent layer of said laminated panelling means and effectively provided with and defining said plurality of interface junction means, at least said convoluted, weight-reducing, and strength-increasing layer of said laminated panelling means being made of a formable thin-sheet high-strength material characterized by substantial strength and rigidity when in hardened form, at least one of said plurality of layers of said laminated panelling means other than said effectively convoluted, weight-reducing, strength-increasing, stiffening layer thereof comprising a low-density, high-specific-volume filler material greatly increasing the effective thickness of the composite laminated panelling means and, thus, providing a maximized volume-to-weight ratio.

8. An article of manufacture as defined in claim 1, wherein said container portions are effectively made of a structural panelling material formed from an initial sheet thereof into laminated panelling means having the desired container portion configuration and including a plurality of panelling material layers firmly bonded together at a plurality of area-spaced, area-disseminated, multi-point interface attachment and junction locations and each comprising an interface junction means, with said plurality of interface junction means being spaced over an area coextensive with said laminated panelling means, said plurality of layers of said laminated panelling means including at least one convoluted weight-reducing, strength-increasing, stiffening layer of structural, formed material having a plurality of convolutions extending transversely from a surface plane thereof, said convolutions having outer contact surface portions in contact with corresponding surface portions of a corresponding, next-adjacent layer of said laminated panelling means and effectively provided with and defining said plurality of interface junction means, at least said convoluted, weight-reducing, and strength-increasing layer of said laminated panelling means being made of a formable thin-sheet high-strength material characterized by substantial strength and rigidity when in hardened form, at least one of said plurality of layers of said laminated panelling means other than said effectively convoluted, weight-reducing, strength-increasing, stiffening layer thereof comprising a low-density, high-specific-volume filler material greatly increasing the effective thickness of the composite laminated panelling means and, thus, providing a maximized volume-to-weight ratio; and combustion-inhibiting means carried by said low-density, high-specific-volume filler material and comprising a quantity of a heat-responsive, combustion-inhibiting agent adapted to decompose when subjected to heat in excess of a predetermined magnitude.

9. An article of manufacture as defined in claim 1, wherein said hollow protective container means is effectively provided with controllably openable and closeable positioning and effective engagement means for normally engaging corresponding portions of the container portions and effectively maintaining said container portions in properly positioned and supported relationship with respect to each other.

10. An article of manufacture as defined in claim 1, including fastening and locking means effectively cooperable with respect to said two container portions for firmly locking them together in closed sealed fragile-object-protecting relationship.

11. An article of manufacture as defined in claim 8, wherein each of said container portions effectively comprises a similarly shaped part of said laminated panelling means formed from an initial sheet thereof into a configuration having an effective medial plane, a surrounding edge flange and having both exteriorly and interiorly formed parts comprising and defining said recess means portions and having exterior contact surface means effectively defining at least portions of a flat contact surface plane.

* * * * *